US007211792B2

(12) United States Patent
Yamaguchi et al.

(10) Patent No.: US 7,211,792 B2
(45) **Date of Patent: *May 1, 2007**

(54) MASS SPECTROMETER

(75) Inventors: Shinichi Yamaguchi, Kyouto-fu (JP); Morio Ishihara, Osaka-fu (JP); Michisato Toyoda, Osaka-fu (JP); Daisuke Okumura, Osaka-fu (JP)

(73) Assignee: Shimadzu Corporation, Kyoto (JP)

( * ) Notice: Subject to any disclaimer, the term of this patent is extended or adjusted under 35 U.S.C. 154(b) by 20 days.

This patent is subject to a terminal disclaimer.

(21) Appl. No.: 11/032,002

(22) Filed: Jan. 11, 2005

(65) Prior Publication Data

US 2005/0151076 A1 Jul. 14, 2005

(30) Foreign Application Priority Data

Jan. 13, 2004 (JP) ............................ 2004-005504

(51) Int. Cl.
*B01D 59/44* (2006.01)
*H01J 49/00* (2006.01)

(52) U.S. Cl. ...................................... 250/287; 250/291

(58) Field of Classification Search ................ 250/287, 250/290, 291
See application file for complete search history.

(56) References Cited

U.S. PATENT DOCUMENTS

| | | | | |
|---|---|---|---|---|
| 6,300,625 | B1 * | 10/2001 | Ishihara | 250/287 |
| 6,906,321 | B2 * | 6/2005 | Yamaguchi | 250/287 |
| 6,949,736 | B2 * | 9/2005 | Ishihara | 250/282 |
| 6,949,738 | B2 * | 9/2005 | Yamaguchi et al. | 250/287 |
| 2005/0045817 | A1 * | 3/2005 | Yamaguchi et al. | 250/287 |
| 2005/0077462 | A1 * | 4/2005 | Yamaguchi et al. | 250/287 |
| 2005/0194528 | A1 * | 9/2005 | Yamaguchi et al. | 250/287 |
| 2005/0247869 | A1 * | 11/2005 | Yamaguchi | 250/287 |

FOREIGN PATENT DOCUMENTS

| | | |
|---|---|---|
| WO | WO 99/39368 | 8/1999 |

* cited by examiner

*Primary Examiner*—David Vanore
(74) *Attorney, Agent, or Firm*—Westerman, Hattori, Daniels & Adrian, LLP.

(57) ABSTRACT

In the mass spectrometer of the present invention, a flight space is provided before the mass analyzer, and the flight space includes a loop orbit on which ions fly repeatedly. While ions fly on the loop orbit repeatedly, ion selecting electrodes placed on the loop orbit selects object ions having a specific mass to charge ratio in such a manner that, for a limited time period when the object ions are flying through the ion selecting electrodes, an appropriate voltage is applied to the ion selecting electrodes to make them continue to fly on the loop orbit, but otherwise to make or let other ions deflect from the loop orbit. If ions having various mass to charge ratios are introduced in the loop orbit almost at the same time, the object ions having the same mass to charge ratio continue to fly on the loop orbit in a band, but ions having mass to charge ratios different from that are separated from the object ions while flying on the loop orbit repeatedly. Even if the difference in the mass to charge ratio is small, the separation becomes large when the number of turns of the flight becomes large. After such a separation is adequately achieved, the ion selecting electrodes can select the object ions with high selectivity, or at high mass resolution. By adding dissociating means, fragment ions originated only from the selected object ions can be analyzed, which enables the identification and structural analysis of the sample at high accuracy.

12 Claims, 4 Drawing Sheets

MASS SPECTROMETER

The present invention relates to a mass spectrometer, especially to one that selects and stores ions of a specific mass to charge ratio or ratios among ions having various mass to charge ratios.

BACKGROUND OF THE INVENTION

The international publication WO99/39368 discloses a mass spectrometer including the elements of: an ion trap device as an ion source; a flight space for letting ions from the ion source fly straight; a reflector for reflecting back the ions flying the flight space using an electric field; and a detector for detecting ions that have flown the flight space. The ion trap device is composed of a ring electrode and a pair of end cap electrodes placed opposite to each other with the ring electrode therebetween. Applying appropriate voltages to the electrodes, a three-dimensional quadrupole electric field is generated in the space (ion trap space) surrounded by the electrodes, where ions are stored, or ions of a specific mass to charge ratio or ratios are selected. Further, by introducing an appropriate collision gas in the ion trap space, ions can be dissociated (Collision Induced Dissociation, CID). Besides such a three-dimensional quadrupole ion trap device, a quadrupole mass filter, such as a four-rod quadrupole filter, is known to be able to store ions.

The ion trap described above stores ions in such a manner that the trajectories of vibrating ions converge in the ion trap space due to the quadrupole electric field generated within the ion trap space. When ions of a specific mass to charge ratio are to be ejected from the ion trap space, an RF electric field whose frequency corresponds to the mass to charge ratio is generated in the ion trap space. However, it is difficult to generate a wide range RF voltage devoid of a specific frequency or a specific frequency band. It is also difficult to generate an RF voltage having a specific frequency or a specific frequency band. Therefore, the mass selectivity (or mass resolution) of ions of the above ion trap is not satisfactory, and it is difficult to adequately eliminate ions having very close (0.01 amu, for example) mass to charge ratio to object ions.

SUMMARY OF THE INVENTION

An object of the present invention is therefore to provide a mass spectrometer that can select object ions with a high mass resolution, whereby ions of a very narrow mass to charge ratio range can be stored in the ion trap space. This enables more reliable mass analysis of the ions themselves, and MS/MS or $MS^n$ analyses using their fragment ions.

The inventors of the present invention have already proposed a mass spectrometer with an improved mass resolution in the U.S. patent applications Ser. No. 10/896,064 and Ser. No. 10/929,768. In the mass spectrometer, a loop orbit is provided in a flight space, and ions are guided to turn the loop orbit many times, which effectively elongates the flight path, and thus the flight time, of the ions, providing an improved mass resolution.

In such a mass spectrometer, the ions flying on the loop orbit may be regarded as being trapped (or stored) there. The present inventors have come to achieve the mass spectrometer of the present invention making use of the loop orbit as an ion storage space and ion selecting space like the conventional ion trap.

Thus the mass spectrometer according to the present invention includes:

a flight space for ions to fly on a substantially same loop orbit repeatedly;

an ion selector provided on the loop orbit for making ions that are passing through the ion selector for a preset limited time period continue to fly on the loop orbit; and a mass analyzer for measuring mass to charge ratios of ions coming from the ion selector.

The above-described loop orbit includes a circular orbit, an elliptic orbit, an "8" shaped orbit, etc., in which the starting point and the end point are the same. Instead of the loop orbit, a spiral or helical orbit can be used, and a reciprocal path on which ions fly to and fro repeatedly may replace the loop orbit in the present invention.

In the mass spectrometer of the present invention, a flight space is provided before the mass analyzer, and the flight space includes a loop orbit on which ions fly repeatedly. While ions fly on the loop orbit repeatedly, the ion selector placed on the loop orbit selects object ions having a specific mass to charge ratio. This is made in the following manner. For a limited time period when the object ions are flying through the ion selector, the ion selector makes them continue to fly on the loop orbit, but otherwise it makes or lets other ions deflect from the loop orbit.

If ions having various mass to charge ratios are introduced in the loop orbit almost at the same time, object ions having the same mass to charge ratio continue to fly on the loop orbit in a band, but ions having mass to charge ratios different from that are separated from the object ions while flying on the loop orbit repeatedly. Even if the difference in the mass to charge ratio is small, the separation becomes large when the number of turns of the flight becomes large. After such a separation is adequately achieved, the ion selector can select the object ions with high selectivity, or at high mass resolution, by making only the object ions continue to fly on the loop orbit for a limited time period. In the other time period, the ion selector makes or lets the other irrelevant ions fly out of the loop orbit. Thus only the object ions remain flying, or stored, in the loop orbit. At an appropriate timing after that, the object ions are taken out of the loop orbit and are mass analyzed.

The ion selector can be an independent device provided besides an ion guide for introducing ions from an ion source to the loop orbit, or for directing ions flying on the loop orbit to the mass analyzer, but the ion selecting function and the ion guiding function can be performed by one device placed on the loop orbit. Alternatively, the orbiting electrodes for guiding the ions to fly on the loop orbit may be used as the ion selector. In summary, any electrodes that can lead ions flying on the loop orbit to two ways, one for making ions continue flying on the loop orbit and the other for making them leave it, can be used as the ion selector.

The mass analyzer of the present invention may be constructed by a second flight space in which ions from the loop orbit fly and an ion detector for detecting ions flying in the second flight space.

The mass spectrometer of the present invention may further include an ion dissociating area or device after the ion selector and before the mass analyzer. In the ion dissociating area or device, the object ions selected as described above and directed to the mass analyzer are dissociated. The fragment ions originated from the object ions are sent to the mass analyzer. Since the object ions selected by the ion selector are very pure, i.e., very few ions of different mass to charge ratios are included, the mass analysis based on such fragment ions has a very high reliability, which enables the identification and structural analysis of the sample at high accuracy.

In order to enhance the reliability and accuracy of the mass analysis, it is preferable to provide an ion reflector in the second flight space in which fragment ions from the dissociating area/device are first separated by their mass to charge ratios. A curved field reflectron (CFR) ion reflector is further preferable for that purpose, because the measurable range of mass to charge ratio is broad and a measurement can cover a wide range of mass to charge ratios of fragment ions.

The ion dissociating area or device can be placed on the loop orbit. In this case, the fragment ions further fly on the loop orbit, and are separated by their mass to charge ratios. By increasing the number of turn of the flight on the loop orbit, the mass resolution of the fragment ions is enhanced.

According to the mass spectrometer of the present invention, object ions flying on the loop orbit can be separated and selected at high mass resolution or selectivity. The selected object ions may continue to fly on the loop orbit, which means that they are stored in the loop orbit. By adding dissociating means (area or device), fragment ions originated only from the object ions can be analyzed, which enables the identification and structural analysis of the sample at high accuracy and high efficiency.

DETAILED DESCRIPTION OF A PREFERRED EMBODIMENT

Figure 1:
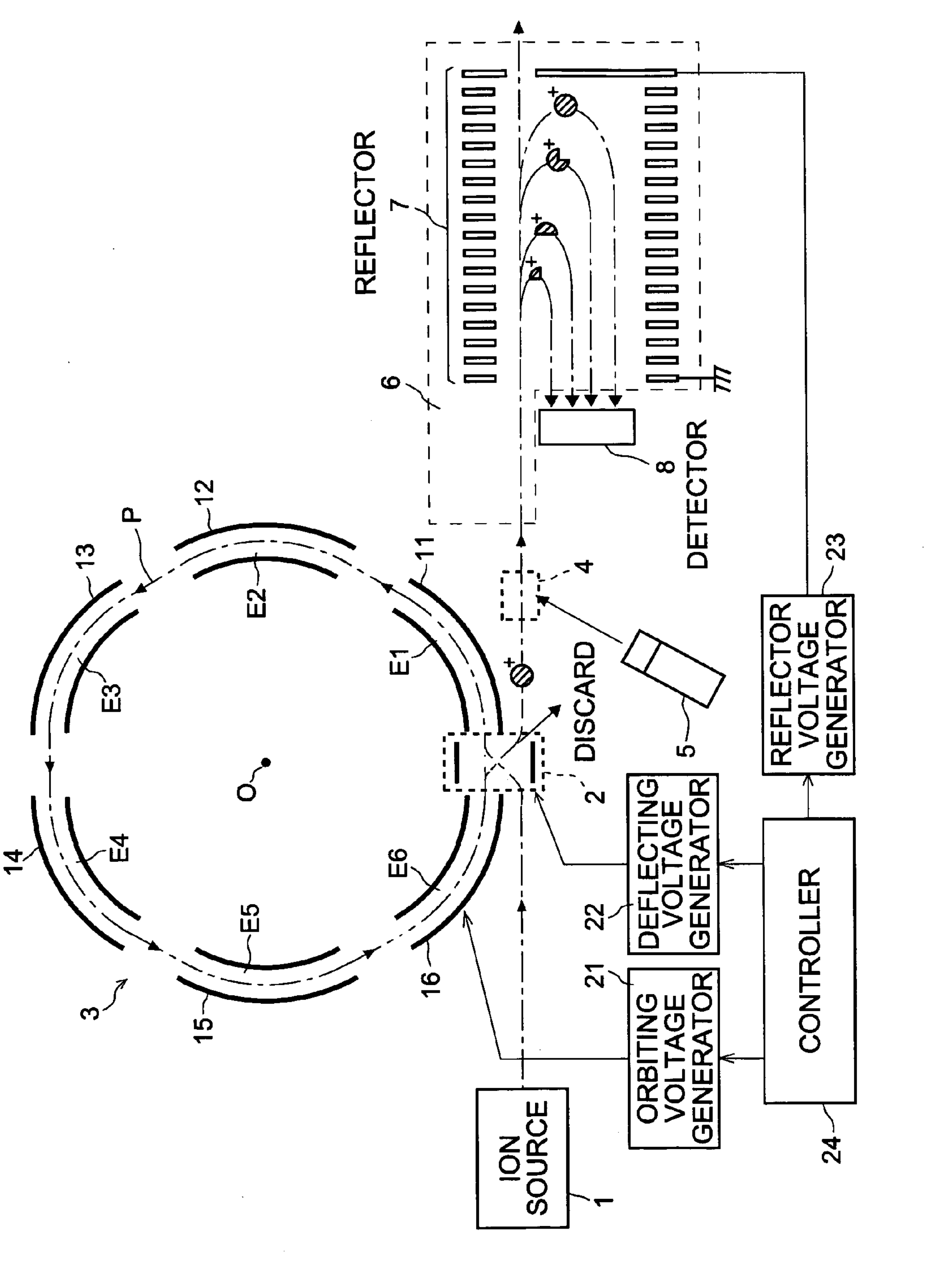
FIG. 1 is a schematic diagram of a mass spectrometer embodying the present invention.

A mass spectrometer embodying the present invention is described referring to FIG. 1. In a vacuum chamber (not shown) of the mass spectrometer, an ion source 1, a first flight space 3, a second flight space 6, and an ion detector 8 are provided with other ordinary devices. In the second flight space 6, a reflector 7 is provided.

In the ion source 1, molecules of a sample are ionized with an appropriate conventional method. When the mass spectrometer of the present embodiment is used as a detector of a gas chromatograph (GC), for example, the ion source 1 uses the electron impact ionization (EI) method, or the chemical ionization (CI) method. When it is used as a detector of a liquid mass chromatograph (LC), the ion source 1 uses the atmospheric pressure chemical ionization (APCI) method or the electro-spray ionization (ESI) method. When high polymer compounds such as protein are to be analyzed, the matrix-assisted laser desorption ionization (MALDI) method is appropriate.

In the first flight space 3, a plurality of (six in the case of FIG. 1) fractional cylindrical electrode sets 11, 12, 13, 14, 15 and 16 are placed for guiding ions to fly on the substantially circular orbit P. The six fractional cylindrical electrode sets 11–16 have the same shape, so that each one is a fraction of 60 degree section of a double-wall cylinder, and are positioned symmetrically around the central axis O. When a predetermined voltage is applied between the electrode pair of a fractional cylindrical electrode set 11–16, fractional cylindrical electric fields E1–E6 are generated between the electrode pair. The six fractional cylindrical electric fields E1–E6 combined form a substantially hexagonal flight space, whose central path is shown by P in FIG. 1.

Between the two fractional cylindrical electrode sets 11 and 16, a pair of deflecting electrodes 2 are placed. The deflecting electrodes 2 are used: (1) to introduce ions generated in the ion source 1 to the loop orbit P, (2) to take out ions flying on the loop orbit P from it and direct them to the second flight space 6, and (3) to take out and abandon ions flying on the loop orbit P. Thus, in the present embodiment, the deflecting electrodes 2 also function as the ion selector.

A dissociation area 4 is provided on the path of ions after leaving the loop orbit P and before entering the second flight space 6. The dissociation area 4 may be a chamber. In order to promote dissociation of ions, a laser beam is irradiated to the dissociation area 4 from a laser source 5. Instead of the laser beam irradiation, a CID gas may be introduced in the dissociation area to promote ion dissociation.

The reflector 7 provided in the second flight space 6 is made from many plate electrodes aligned along the ion flight path. Appropriate voltages are applied to the plate electrodes to form a reflecting electric field having a higher potential as ions penetrate deeper into the reflector 7. The reflector 7 is constructed as the so-called Curved Field Reflectron (CFR) in which the potential slope of the electric field is not linear but convex downward. Owing to such potential arrangement, ions are reflected at a position in the depth of the reflector 7 corresponding to their energy, and arrive at the detector 8. Since particles bearing no electric charge are unaffected by the electric field, they go straight and never reach the detector 8. The detector 8 detects ions at different time points depending on their mass to charge ratios, and generates an electric signal corresponding to the amount (number) of ions detected.

An orbiting voltage generator 21, a deflecting voltage generator 22 and a reflector voltage generator 23 are provided respectively for applying voltages to the fractional cylindrical electrode sets 11–16, the deflecting electrodes 2 and the reflector 7. These voltage generators 21, 22 and 23 are connected and controlled by a controller 24.

Though the loop orbit P shown in FIG. 1 is substantially circular, it may have any shape as long as it forms a loop, such as an ellipse or an “8” shape. Further, it may not be a complete loop; a spiral or helical path, or a reciprocal path in which ions fly to and fro repeatedly can replace the loop in the present invention.

As a typical example of mass analysis, an MS/MS mass analysis is described using a mass spectrometer according to the present invention. The object of the MS/MS mass analysis here is to obtain information on the molecule of a specific component of a sample.

In the ion source 1, molecules and atoms included in the sample are ionized using an appropriate method. At this time, various molecules and atoms besides those of the object component are ionized, so that the generated ions include a wide variety of mass to charge ratios. These ions are given a preset kinetic energy, and fly toward the deflecting electrodes 2. Under the control of the controller 24, the deflecting voltage generator 22 applies a predetermined deflecting voltage to the deflecting electrodes 2, whereby the ions are deflected to fly on the loop orbit P. Since the flight time of ions before they reach the deflecting electrodes 2 depends on the mass to charge ratio of the ions, it is possible to roughly choose the object ions (i.e., ions of the object component) by limiting the time period within which the deflecting voltage for introducing ions to the loop orbit P is applied. Otherwise, a discarding voltage is applied to the deflecting electrodes 2 so that unnecessary ions are deflected out from the loop orbit P. If the distance between the ion source 1 and the deflecting electrodes 2 is not enough, this rough selection of ions may not be so effective.

Ions having the mass to charge ratios close to that of the object ions cannot be adequately discriminated by the rough selection between the ion source 1 and the deflecting electrodes 2, and they enter the loop orbit P with the object ions. But the object ions and irrelevant ions gradually separate while they fly on the loop orbit P repeatedly, and the gap is larger as the difference in the mass to charge ratio is larger. The gap develops as the difference in the lap time of the ions at the deflecting electrodes 2, so that it is easier to control the voltage to the deflecting electrodes 2 for separating the ions as the gap is larger. Precisely saying, after the object ions are introduced to the loop orbit P, the voltage to the deflecting electrodes 2 is controlled so that an appropriate orbiting voltage is applied in a period spanning the time point at which the object ions pass the deflecting electrodes 2 to keep the object ions fly on the loop orbit P, while otherwise an appropriate discarding voltage is applied to discard irrelevant ions. Such a selecting (or discarding) control may be made at every turn of flight of the ions, or it may be made at every two, three or more turns.

Since the mass resolution of the selection becomes better as the number of turns of the ion flight on the loop orbit P becomes larger, it is possible to choose the object ions and discard irrelevant ions with the mass resolution of 0.01 amu. Another advantage of the present method is that irrelevant ions having a larger difference in the mass to charge ratio from the object ions are discarded earlier. This prevents the lap of slower ions caught up by the object ions, or that of faster ions catching up with the object ions.

Thus only the object ions are selected, and they continue to fly on the loop orbit P as long as the voltage to the deflecting electrodes 2 is maintained. This means that the object ions are adequately trapped and stored in the loop orbit P, which accomplishes the same function as, for example, the conventional three-dimensional quadrupole ion trap device. With regard to the selecting ability or the mass resolution of the ion selection, the method and device of the present invention is far better than the conventional devices, and fewer irrelevant ions remain mixed in the selected ions.

After the object ions are adequately selected and kept flying on the loop orbit P for a certain time period, the voltage to the deflecting electrodes 2 is changed at an appropriate timing to make the object ions leave the loop orbit P and fly to the second flight space 6. The object ions leaving the loop orbit P pass the dissociation area 4 before the second flight space 6, when the object ions are irradiated by the laser beam from the laser source 5 and dissociations of the object ions occur. The dissociating manners are various, and depend on the kind of the molecules of the ions. Thus a plurality of species of fragment ions originated from the object ions are generated and enter the second flight space 6.

The fragment ions fly at almost the same speed as the precursor (parent) ions in the second flight space 6 and enter the reflector 7. Since the reflecting electric field having the potential slope as described before is formed in the reflector 7, ions having smaller mass to charge ratios are reflected earlier at a shallower position and ions having larger mass to charge ratios are reflected later at a deeper position of the reflector 7. Thus the difference in the mass to charge ratios of ions appears as the difference in the flight time of the ions, so that fragment ions are detected by the detector 8 in the order of smaller to larger mass to charge ratios. The detection signal is sent from the detector 8 to a data processor (not shown), where the detection signal is processed to create a mass spectrum with the abscissa as the mass to charge ratio and the ordinate as the intensity of the signal. From the data of peaks in the mass spectrum, the mass to charge ratio of the ion corresponding to each peak is determined, and from the data of the mass to charge ratios of the fragment ions, the object ions can be estimated or determined.

Thus, according to the mass spectrometer of the present invention, object ions are selected with high selectivity, or at high resolution, whereby the dissociated ions are mostly composed of fragment ions originated from the object ions and less impurity ions are included.

Figure 2:
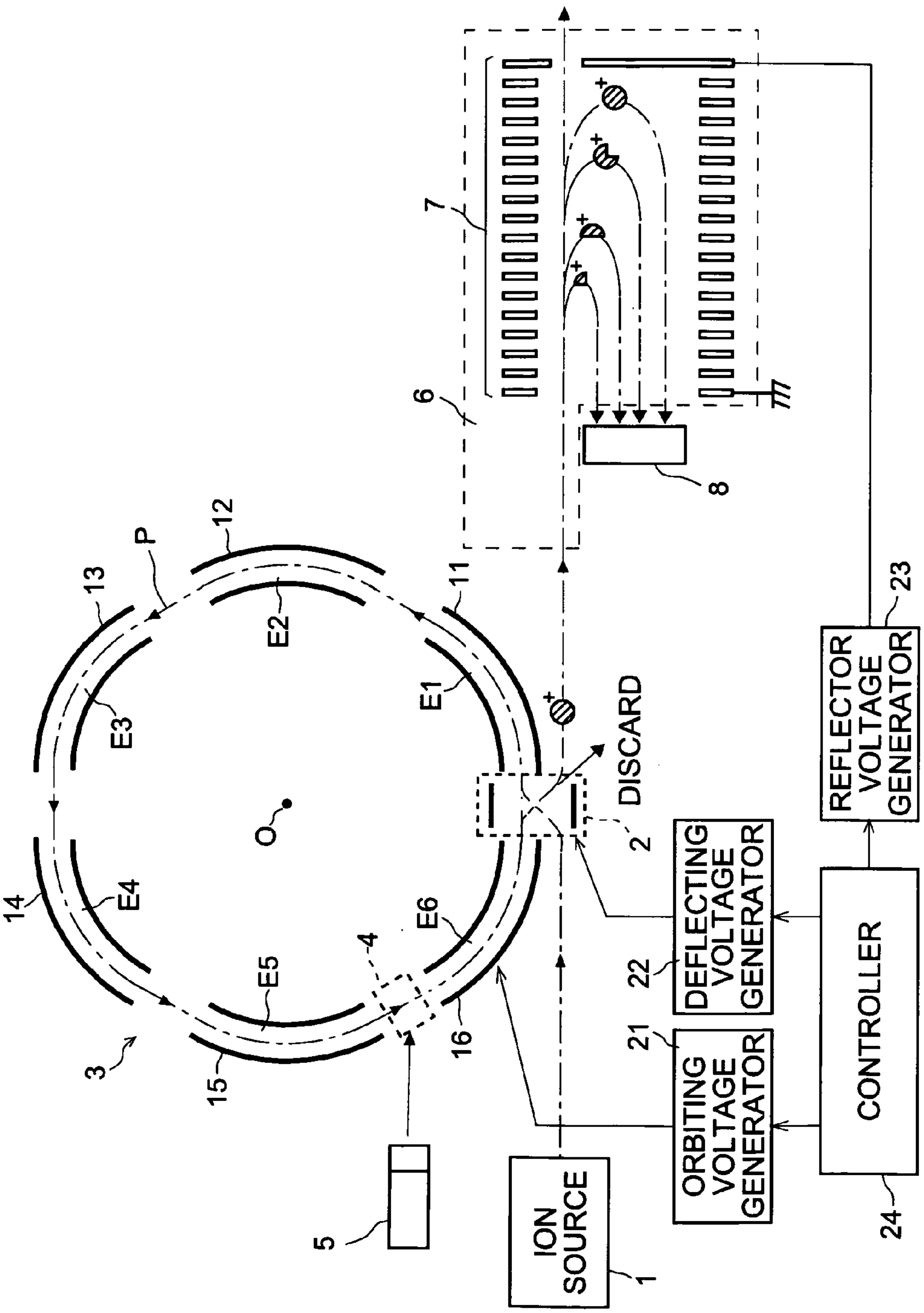
FIG. 2 is a schematic diagram of a mass spectrometer according to the present invention where the ion dissociation area is provided on the loop orbit.

Although only an exemplary embodiment of the present invention has been described in detail above, those skilled in the art will readily appreciate that many modifications are possible in the exemplary embodiments without materially departing from the novel teachings and advantages of this invention. Accordingly, all such modifications are intended to be included within the scope of this invention. For example, the dissociation area 4 is provided outside of the loop orbit P in FIG. 1. It is possible to place the dissociation area 4 on the loop orbit P, as shown in FIG. 2, in which case the fragment ions generated by the dissociation of the object ions can be further guided to fly on the loop orbit P in the same manner. In this case, the orbiting voltage to the fractional cylindrical electrode pairs E6, E1–E5 should be modified for the fragment ions to properly fly on the same loop orbit P. The process of an MS/MS analysis using the modified mass spectrometer is as follows. Object ions are selected and stored in the loop orbit P through repeated turns of their flight, and the selected object ions are dissociated in the dissociation area on the flight path of the loop orbit P. The fragment ions generated in the dissociation also fly and turn the loop orbit P repeatedly, during which they are separated according to their mass to charge ratios. Similarly as the precursor object ions, fragment ions having a specific mass to charge ratio are selected and kept in the loop orbit P. Then at an appropriate timing, the selected fragment ions are taken out of the loop orbit P, and led to the second flight space 6 where they are detected by the detector 8. This produces a mass spectrum of the fragment ions with a very high reliability.

Figure 3:
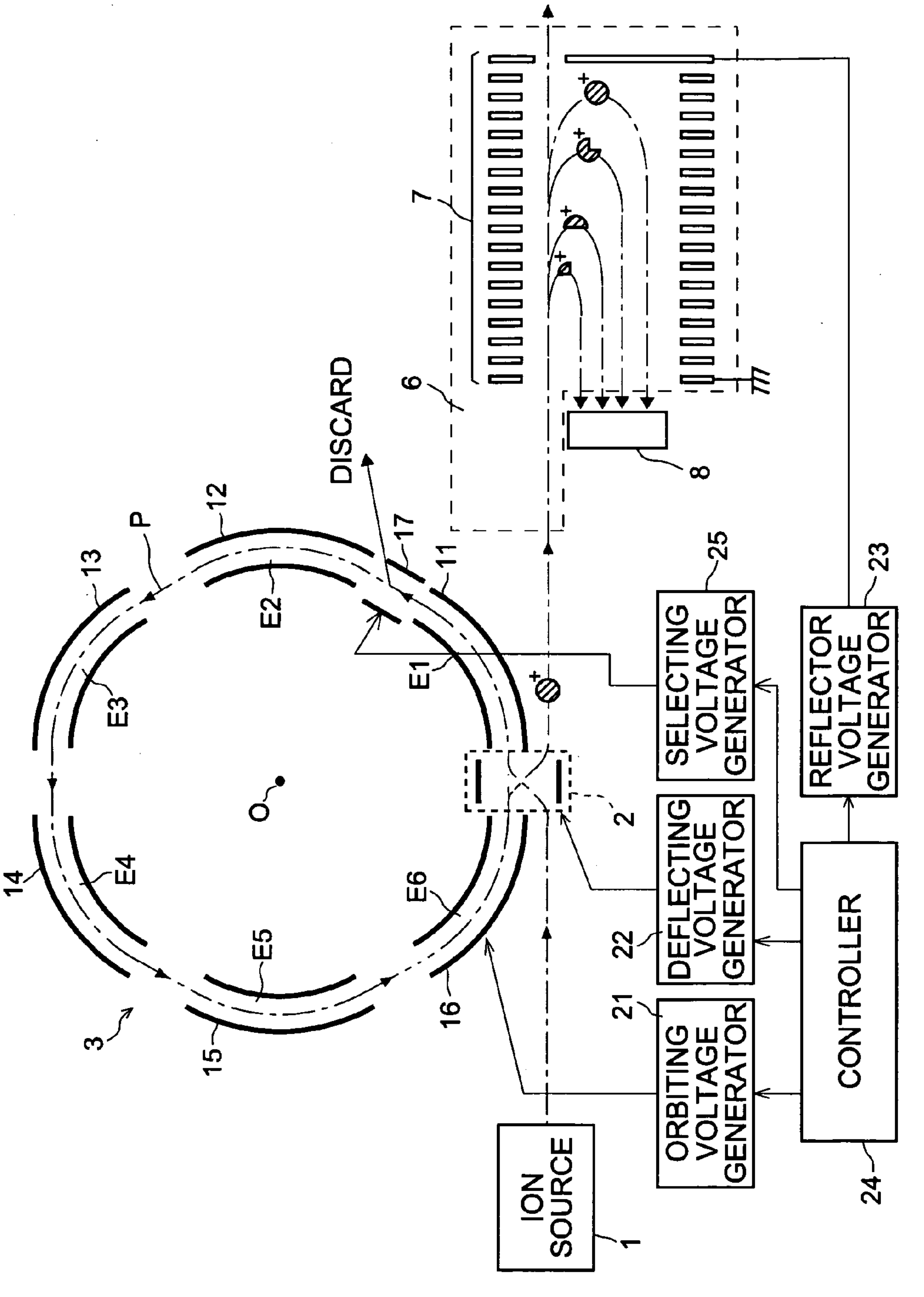
FIG. 3 is a schematic diagram of a mass spectrometer according to the present invention where a dedicated ion selecting electrodes are provided.
Figure 4:
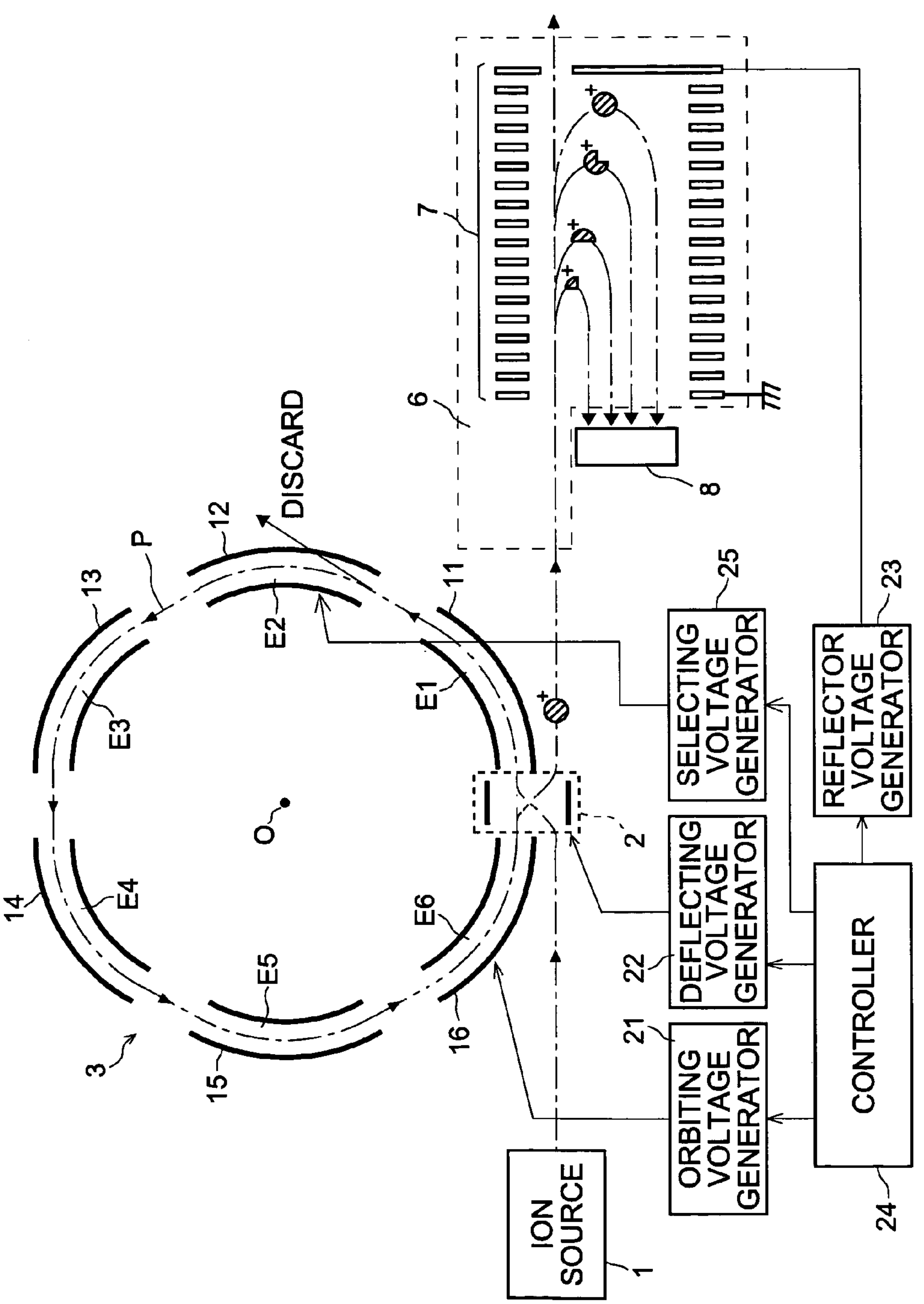
FIG. 4 is a schematic diagram of a mass spectrometer according to the present invention where a fractional cylindrical electrode set is used as the ion selecting electrodes.

The mass spectrometer can be modified further. The mass analyzer of the fragment ions may be any type other than the reflector 7 and the detector 8 of the above embodiment. The laser source 5 as the dissociating means may be replaced by one using a CID gas. The selection of ions among ions flying on the loop orbit P is performed by controlling the voltage applied to the deflecting electrodes 2 in the above embodiment. It is possible to provide a dedicated ion selecting electrodes 17 and an ion selecting voltage generator 25, as shown in FIG. 3, for controlling the selection besides the deflecting electrode 2 which controls only the introduction and ejection of ions into and from the loop orbit P. Further, it is possible to use the orbiting electrodes (the fractional cylindrical electrode sets 11–16 in the case of the above embodiment) to select ions. That is, as shown in FIG. 4, by changing the proper voltage to one (or more than one) of the fractional cylindrical electrode sets temporarily, ions passing through the fractional cylindrical electrode sets 12 at that moment can be avoided from the loop orbit P. Thus irrelevant ions can be eliminated and object ions can be preserved in the loop orbit P.

What is claimed is:

1. A mass spectrometer comprising:

a flight space for ions to fly on a substantially same loop orbit repeatedly;

an ion selector provided on the loop orbit for making ions that are passing through the ion selector for a preset limited time period continue to fly on the loop orbit; and a mass analyzer for measuring mass to charge ratios of ions coming from the ion selector.

2. The mass spectrometer according to claim 1, wherein ion dissociating means is further provided after the ion selector and before the mass analyzer.

3. The mass spectrometer according to claim 2, wherein the mass analyzer include an ion reflector.

4. The mass spectrometer according to claim 3, wherein the ion reflector is a curved field reflectron.

5. The mass spectrometer according to claim 1, wherein ion dissociating means is further provided on the loop orbit.

6. The mass spectrometer according to claim 5, wherein the mass analyzer include an ion reflector.

7. The mass spectrometer according to claim 6, wherein the ion reflector is a curved field reflectron.

8. The mass spectrometer according to claim 1, wherein the ion selector is also used to introduce ions into the loop orbit and to direct ions on the loop orbit to the mass analyzer.

9. The mass spectrometer according to claim 8, wherein the ion selector is made of a pair of electrodes placed on the loop orbit.

10. The mass spectrometer according to claim 1, wherein the ion selector is provided besides means for introducing ions into the loop orbit and directing ions on the loop orbit to the mass analyzer.

11. The mass spectrometer according to claim 1, wherein the loop orbit is formed by a plurality of fractional cylindrical electrode sets.

12. The mass spectrometer according to claim 11, wherein an ion selecting means is provided to one or some of the fractional cylindrical sets.

* * * * *